(12) United States Patent
Nagashima

(10) Patent No.: US 10,862,787 B2
(45) Date of Patent: Dec. 8, 2020

(54) SYSTEM, MANAGEMENT APPARATUS, METHOD, AND STORAGE MEDIUM

(71) Applicant: CANON KABUSHIKI KAISHA, Tokyo (JP)

(72) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/689,686

(22) Filed: Nov. 20, 2019

(65) Prior Publication Data

US 2020/0169490 A1 May 28, 2020

(30) Foreign Application Priority Data

Nov. 26, 2018 (JP) ................................. 2018-220734
Mar. 15, 2019 (JP) ................................. 2019-048234

(51) Int. Cl.
*H04L 12/26* (2006.01)
*G06F 11/30* (2006.01)
*G06F 9/48* (2006.01)

(52) U.S. Cl.
CPC ........ *H04L 43/0876* (2013.01); *G06F 9/4843* (2013.01); *G06F 11/3006* (2013.01); *H04L 43/067* (2013.01); *H04L 43/0817* (2013.01)

(58) Field of Classification Search
CPC ............. H04L 43/0876; H04L 43/0817; H04L 43/067; G06F 11/3006; G06F 9/4843
See application file for complete search history.

(56) References Cited

U.S. PATENT DOCUMENTS

| | | | | |
|---|---|---|---|---|
| 5,202,987 A | * | 4/1993 | Bayer | G06F 8/451 713/375 |
| 8,209,701 B1 | * | 6/2012 | Roytman | G06F 9/5027 718/106 |
| 2004/0199725 A1 | * | 10/2004 | Khawand | G06F 12/084 711/130 |
| 2008/0195843 A1 | * | 8/2008 | Muniandy | G06T 15/08 712/31 |
| 2008/0250413 A1 | * | 10/2008 | Shi | G06F 9/4862 718/102 |
| 2014/0304713 A1 | * | 10/2014 | Olsson | G06F 9/5072 718/106 |
| 2018/0361586 A1 | * | 12/2018 | Tan | B25J 9/1666 |
| 2019/0050187 A1 | * | 2/2019 | Nakazawa | G06F 3/1203 |
| 2019/0340269 A1 | * | 11/2019 | Biernat | G06F 16/248 |

FOREIGN PATENT DOCUMENTS

JP 2013-045157 A 3/2013

* cited by examiner

*Primary Examiner* — El Hadji M Sall
(74) *Attorney, Agent, or Firm* — Canon U.S.A., Inc. I.P. Division

(57) ABSTRACT

A management apparatus transmits information of a manager control task to each agent service, manages an execution result of processing executed in each network device, which is a processing target, for each of the sub-tasks generated at each agent service based on the manager control task, and transmits a response indicating whether execution of a sub-task is permitted based on an inquiry from each agent service to control the number of sub-tasks executed in parallel in the same time slot.

12 Claims, 10 Drawing Sheets

FIG.4

| LIST OF AGENTS | | |
|---|---|---|
| AGENT | MANAGEMENT CLIENT | MONITORING TARGET DEVICE |
| Agent-A | MC-A | ipA1 – ipAn |
| Agent-B | MC-B | ipB1 – ipBn |

FIG.5

| LIST OF DEVICES | | |
|---|---|---|
| DEVICE NAME | PRODUCT NAME | ADDRESS |
| DevA1 | DevA | ipA1 |
| DevA2 | DevA | ipA2 |
| ⋮ | ⋮ | ⋮ |
| DevAn | DevA | ipAn |
| DevB1 | DevB | ipB1 |
| DevB2 | DevB | ipB2 |
| ⋮ | ⋮ | ⋮ |
| DevBn | DevB | ipBn |

SYSTEM, MANAGEMENT APPARATUS, METHOD, AND STORAGE MEDIUM

BACKGROUND

Field of the Disclosure

The present disclosure relates to control in a manager-agent type system for managing a plurality of network devices such as image processing apparatuses.

Description of the Related Art

A system that manages a plurality of network devices connected to a network is known. A management apparatus as a manager manages one or more agents to cause the agents to monitor the plurality of network devices in a distributed manner.

A user, such as a network administrator, can operate a management screen provided by the management apparatus to instruct each agent to perform a job (hereinafter referred to as a "task"). The task includes search processing, acquisition processing to acquire equipment information, operation information, and a status information of the network devices, and distribution processing of a setting value and software. Based on the task, each agent executes processing with respect to the network devices, which are monitoring targets, and notifies the management apparatus of the results.

A system in which a management apparatus that manages a network device distributes software contents such as firmware is known (e.g., Japanese Patent Application Laid-Open No. 2013-045157).

In Japanese Patent Application Laid-Open No. 2013-045157, the management apparatus controls firmware distribution corresponding to a model type of the network device in response to an acquisition request from the network device.

The above-described agent can instruct the network device to download software contents from a content management server (e.g., repository server) that manages software, and to install and update the software contents, based on the content of the task.

However, when a plurality of agents concurrently executes this instruction on respective monitoring targets, there is a possibility that access to the repository server by a large number of network devices may be concentrated in a short period of time. Thus, the concentration of access to the repository server may lead to a delay of the task completion or an error of the task execution.

As described above, a load within the system other than those of the agents may increase by executing processing for a plurality of target network devices in the same period of time, in some cases of a task created in the management apparatus. In such a case, the load is not sufficiently adjusted as the whole system, even if processing loads of respective agents are individually adjusted.

SUMMARY

According to an aspect of the present disclosure, a system includes a plurality of agent apparatuses, and a management apparatus configured to monitor a plurality of network devices via the plurality of agent apparatuses, wherein the management apparatus includes at least one memory storing first instructions and at least one processor executing the first instructions causing the management apparatus to create a task in which a sub-task process content and a network device which is a processing target are set, and transmit information of the task to each agent apparatus configured to monitor one or more network devices set as the processing target in the created task, wherein each agent apparatus includes at least one memory storing second instructions and at least one processor executing the second instructions causing the agent apparatus to receive the information of the task, and transmit a request for making an inquiry as to whether execution of each of one or more sub-tasks corresponding to the one or more network devices set as the processing target in the received task is to be permitted on the management apparatus in a case where the task is a manager control task, wherein the first instructions further cause the management apparatus to manage an execution result of processing executed in each network device for each of the one or more sub-tasks based on the manager control task, and transmit a response indicating whether execution is permitted for the inquiry to control a number of sub-tasks executed in parallel in a same time slot, wherein the second instructions further cause the agent apparatus to instruct a network device which is a target of a sub-task for which execution is permitted for the inquiry to perform processing relating to the sub-task, and transmit a request for making an inquiry again to the management apparatus for a sub-task for which execution is not permitted by the management apparatus after a predetermined time period has elapsed.

Further features of the present disclosure will become apparent from the following description of exemplary embodiments with reference to the attached drawings.

BRIEF DESCRIPTION OF THE DRAWINGS

FIG. 4 is a table illustrating an example of a list of agents managed by a management apparatus.

FIG. 5 is a table illustrating an example of a list of devices managed by the management apparatus.

DESCRIPTION OF THE EMBODIMENTS

Figure 1:
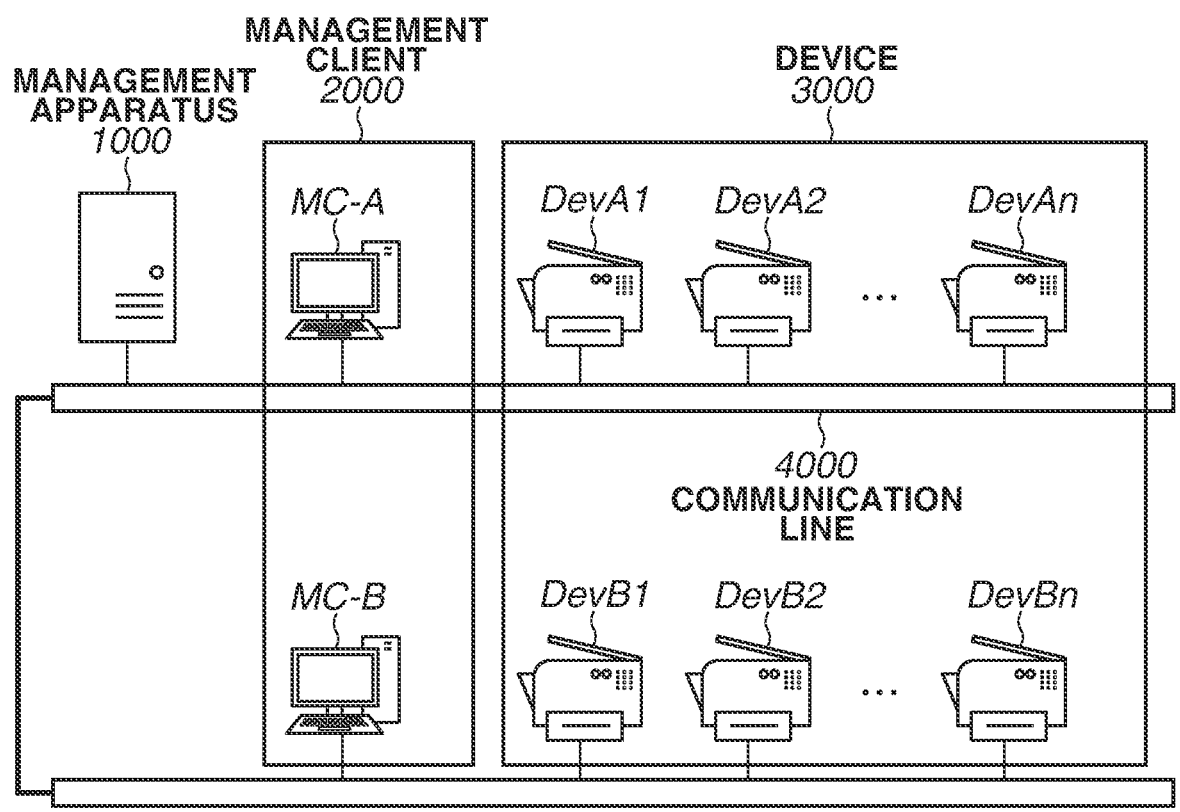
FIG. 1 is a block diagram illustrating an example of a configuration of a network system according to an exemplary embodiment.

FIG. 1 is a block diagram illustrating a configuration of a network system according to a first exemplary embodiment. The system illustrated in FIG. 1 includes a management apparatus 1000, MC-A and MC-B (two management clients 2000), DevA1 to DevAn and DevB1 to DevBn (a plurality of network devices 3000) to be managed. These apparatuses are connected with each other via a communication line 4000. A program is executed to allow the management apparatus 1000 to operate as a manager. A program is executed to allow the management client 2000 to operate as an agent. Examples of the network device 3000 include an image processing apparatus (e.g., a copying machine, a printer, and a scanner), a network camera, digital medical equipment, and home electric appliances.

A program for an agent may be further executed to allow the management apparatus 1000 to operate as the agent, so that the management apparatus 1000 can function as both the manager and the agent. In this case, the management apparatus 1000 performs communication by using a communication protocol similar to a communication protocol used by the manager and the agent to perform communication via a network.

Hereinafter, MC-A and MC-B, which are the management clients 2000, will be respectively referred to as a management client MC-A and a management client MC-B. The network device 3000 will also be referred to as a device 3000, a device DevA1, or the like.

The management apparatus 1000 manages information of a plurality of management clients 2000 and information of devices 3000 monitored by the respective management clients 2000 in association with each other. The management apparatus 1000 then provides a management screen to a user such as a network administrator, and creates a task that defines processing to be performed on one or more devices 3000 through operation via the screen. Each management client 2000 executes processing on the devices 3000 based on content of the created task (task information). Each management client 2000 also has a function to notify a management server of an execution result of the task. Examples of the processing defined in the task include search processing, acquisition processing to acquire equipment information, operation information, and a status, and distribution processing to distribute a setting value and software.

In the present exemplary embodiment, the management apparatus 1000 also operates as a content management server that performs processing of software distribution. Thus, the management apparatus 1000 also has repository service for realizing a function for managing content, such as software and setting information, and for allowing the device 3000 to download the content, as well as a function for operating as the manager. Distribution processing to distribute firmware, which is an example of software, will be described in detail below.

The repository service can be achieved using a server apparatus different from the management apparatus 1000. In a case where the management apparatus 1000 and the repository service are configured to be in the same apparatus as in the present exemplary embodiment, the number of physical servers can be reduced. However, concentration of access from a plurality of devices not only affects other functions of the management apparatus but also degrades functionality of the repository service.

Figure 2:
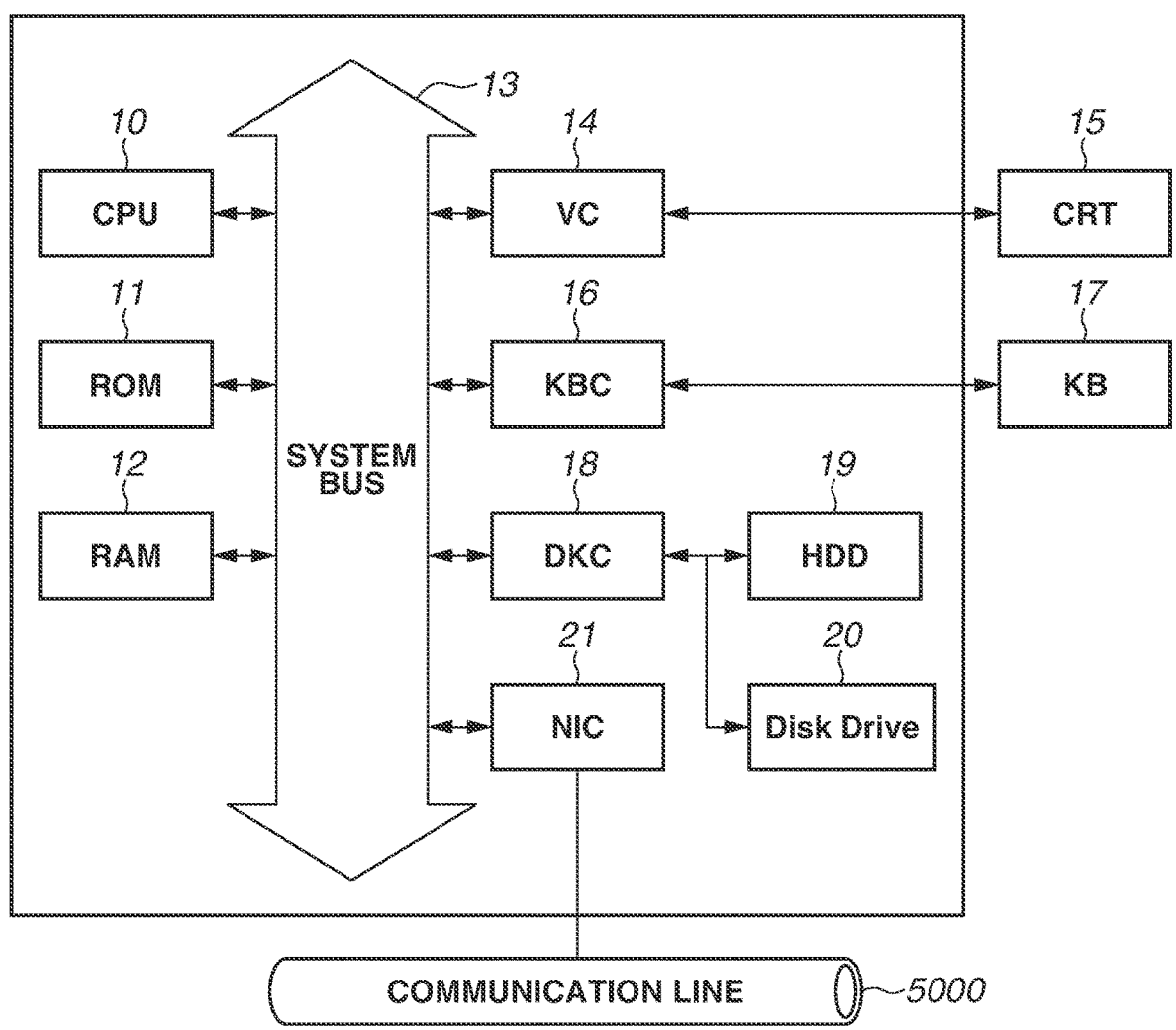
FIG. 2 is a block diagram illustrating an example of a hardware configuration of an information processing apparatus.

FIG. 2 illustrates an example of a hardware configuration of an information processing apparatus to achieve the management apparatus 1000, the management client 2000, and the device 3000.

A central processing unit (CPU) 10 executes a program stored in a read only memory (ROM) 11 and a hard disk drive (HDD) 19 using a random access memory (RAM) 12 as a work area. In a case of, for example, the management apparatus 1000, a program for implementing as a manager unit 30 is executed. A system bus 13 connects respective components within the apparatus. A program for implementing as the manager unit 30 and/or an agent service unit 37 can be supplied from a storage medium, such as a floppy disk (FD), a compact disc read only memory (CD-ROM), a digital versatile disc (DVD), a magnetic tape, and an integrated circuit (IC) memory card. These media can be mounted at, for example, a disk drive 20. The CPU 10 accesses the HDD 19 and the disk drive 20 via a disk controller (DKC) 18, and installs, for example, the manager unit 30 on an HDD 19.

The CPU 10 displays user interface on a display device (e.g., cathode ray tube) 15 via a video card (VC) 14. The CPU 10 performs control based on an input instruction to a user interface from a keyboard (KB) 17 or a pointing device, such as a mouse, via a keyboard controller (KBC) 16. The CPU 10 performs data communication with the agent service unit 37 included in the management client 2000 on the communication line 4000 via a network interface board (NIC) 21. In a case of the management client 2000 and the device 3000, the CPU 10 executes programs to function as the agent service unit 37 and a device service unit 38, respectively. In a case where the device 3000 is a printer, a hardware configuration such as a print engine is added. Firmware and/or an application for providing inherent functions are installed in the device 3000 and various kinds of settings are applied to the device 3000, and these kinds of information are managed in the HDD 111.

Figure 3:
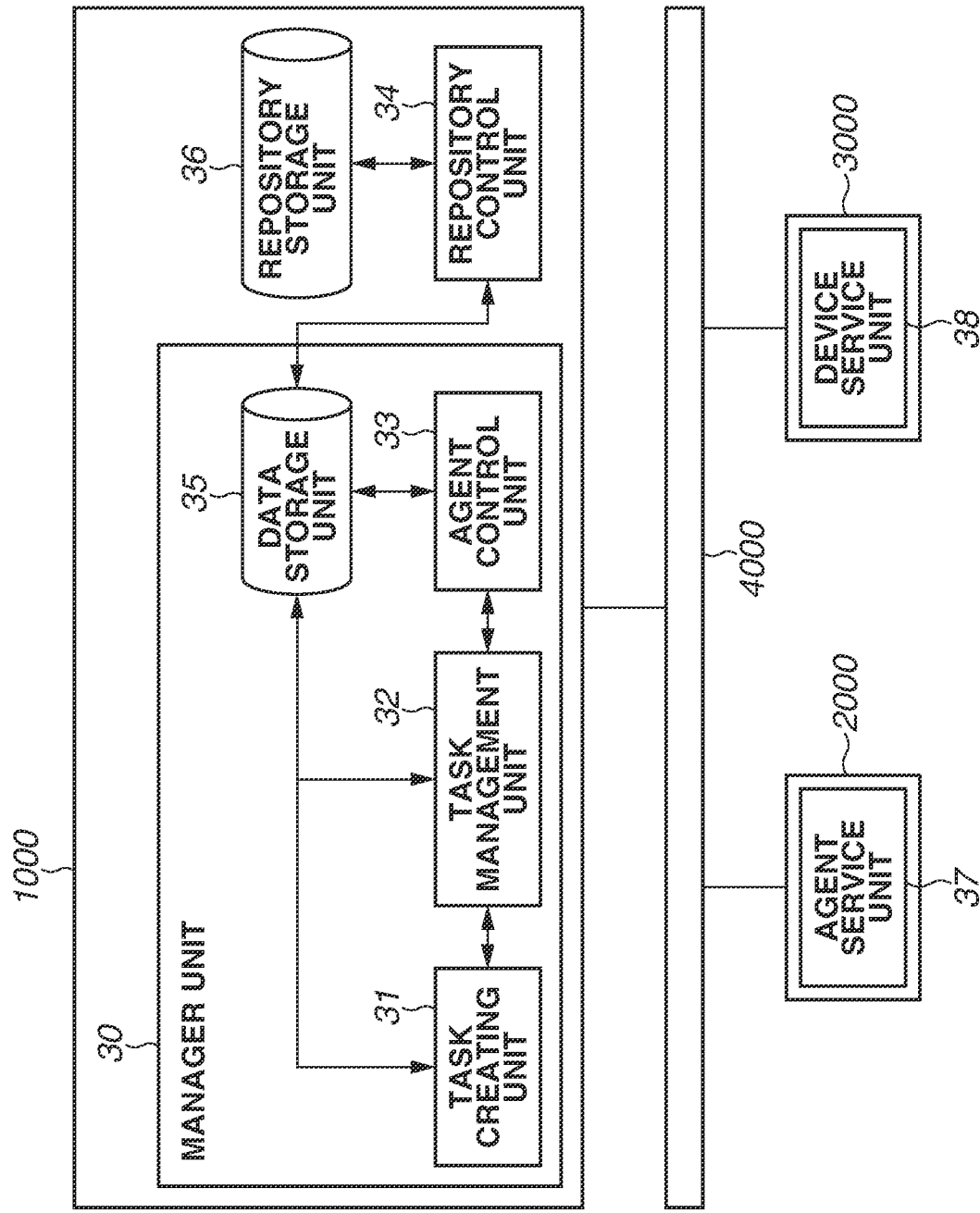
FIG. 3 is a block diagram illustrating an example of a software module configuration of each apparatus according to an exemplary embodiment.

FIG. 3 is a block diagram illustrating an example of software module configuration of the respective apparatuses according to an exemplary embodiment of the present disclosure.

The management apparatus 1000 includes the manager unit 30, a repository control unit 34, and a repository storage unit 36. The manager unit 30 includes a task creating unit 31, a task management unit 32, an agent control unit 33, and a data storage unit 35. The agent service unit 37 is installed in each management client 2000, and is resident as one type of operating system (OS) services. The device service unit 38 to communicate with the agent service unit 37 and the manager unit 30 is installed in each device 3000. The device service unit 38 is resident and performs communication with the management apparatus 1000 using network protocol, such as hypertext transfer protocol (HTTP).

The manager unit 30 of the management apparatus 1000 can implement a web-based application. In this case, the manager unit 30 can be used via the web page provided by, for example, the task creating unit 31. The web page is accessed via a web browser operating on another information processing apparatus.

The task creating unit 31 creates various kinds of tasks based on an operation from a user, and the tasks are stored in the data storage unit 35. In the task, a process content, an execution schedule, and a list of target devices indicating processing targets are defined as task information. In a case of, for example, firmware distribution, the process content includes information of firmware to be distributed, and information (e.g., uniform resource locator (URL)) used for obtaining firmware. In the execution schedule, an execution timing such as whether the task should be executed immediately, executed at designated time, or regularly executed can be arbitrarily set. The task management unit 32 instructs the agent control unit 33 about information of a task to be executed based on the execution schedule set to the task.

The agent control unit 33 instructs the agent service unit 37 included in the management client 2000, which is to execute the task, based on a content of the instructed task. The agent control unit 33 and the agent service unit 37 can communicate with each other using web service, or the like.

The agent service unit 37 can notify the manager unit 30 of an execution result of the task, for example, by writing an execution result of a sub-task in the data storage unit 35.

The data storage unit 35 provides a database, or the like, using the HDD 19. In the data storage unit 35, information of the device 3000, which is a target to be monitored by the agent service unit 37 included in each management client 2000, is managed as a list. FIG. 4 illustrates a list of agents managed by the data storage unit 35. The list includes an agent, a management client, and identification information of the device (e.g., a name and network identifier).

The list of agents indicates that an agent having an agent name of, for example, "Agent-A" operates on the management client MC-A, and monitoring target devices of the agent are a plurality of the devices 3000 whose internet protocol (IP) addresses are ipA1 to ipAn. As information for identifying monitoring target devices other than the IP addresses, a host name used in a domain name system (DNS), such as a fully qualified domain name (FQDN), can also be used to designate the devices.

Search processing for a device on the network that is an example of the task will be described next. In the search, simple network management protocol (SNMP), IP Broadcast, service location protocol (SLP)/Multicast, or the like, are used.

The task creating unit 31 included in the management apparatus 1000 creates a task that designates a protocol, a search range, and an execution timing to be used in the search processing. The task management unit 32 provides information of the task to the agent control unit 33 at an execution timing. The agent control unit 33 instructs each agent to execute the task.

The agent service units 37 of the agents Agent-A and Agent-B transmit a packet for search to the designated search range based on content of the task instructed by the agent control unit 33. The agent service unit 37 acquires, as a result of device search, equipment information such as a device name, a product name, and address information. The agent service unit 37 then stores the equipment information into the data storage unit 35.

The data storage unit 35 manages results of the device search as a list of devices. FIG. 5 illustrates an example of the list of devices. The list of devices includes a device name (such as a serial number), a product name (apparatus model information) and address information. For example, the list of devices indicates that the device DevA1 is a device whose product name is DevA, and the address is ipA1. Information to be registered in the list of devices can be a comma-separated values (CSV) file, or the like, which can be imported to the management apparatus 1000. It is also possible to select a device included in the list of devices and register the device in association with one of agents in the list of agents.

The repository control unit 34 included in the management apparatus 1000 manages content such as firmware, an application, and setting information of the device using the repository storage unit 36. The repository storage unit 36 provides a database, or the like, using the HDD 19. The repository control unit 34 causes content such as firmware to be downloaded in response to a content request from the device service unit 38 included in the device 3000.

A firmware updating task will be described next. The firmware updating task is one type of tasks created at the task creating unit 31. Contents of the task defined include firmware information, an execution timing, and a target device.

The agent service unit 37, which receives an instruction to execute a task from the agent control unit 33, instructs the device service unit 38, which is designated as a task target among the managed devices 3000, to update firmware. The device service unit 38, which receives the instruction accesses the repository control unit 34, requests appropriate firmware, and downloads a file including the firmware. Thereafter, the file is opened, and the firmware is applied to the target device, so that update processing is performed.

The repository control unit 34 receives a result of the update processing from the device service unit 38, and writes the result in the data storage unit 35. The data storage unit 35 holds a table having a record for each target device defined in the firmware updating task. The device service unit 38 records the execution result, processing time, or the like, in a record corresponding to the target device.

In the device management system according to the present disclosure, the agent control unit 33 included in the management apparatus 1000 executes dedicated processing as will be described below regarding a content (e.g., firmware) distribution task. The processing is to control access from the device service unit 38 to the repository control unit 34. A task in which the number of sub-tasks to be concurrently executed is required to be controlled, including the content distribution task, is referred to as a manager control task. The agent service unit 37 manages a type of a task (process content) corresponding to the manager control task.

First, the agent control unit 33 included in the management apparatus 1000 generates an execution control ticket (hereinafter, referred to as a ticket), and stores the ticket in the data storage unit 35. The execution control ticket includes information to control a start of processing (sub-task) in each device based on a task in association with access to the repository control unit 34. A plurality of tickets is generated to manage the total number of sub-tasks that can be executed in parallel in the same time slot at a plurality of agent service units 37. The number of the generated tickets is determined based on, for example, resource of hardware included in an information processing apparatus in which the repository control unit 34 operates.

The sub-task is a unit of internally executed processing created for each target device by the agent service unit 37 that accepts an instruction to execute the content distribution task. Specifically, in the whole system, with respect to one task, sub-tasks of the number corresponding to the number of devices designated when the task is created are made at each agent service unit 37.

The tickets managed in the data storage unit 35 are used in common by a plurality of sub-tasks created in a plurality of respective tasks, when the plurality of tasks, which involves access to the repository control unit 34, is started in parallel on the management apparatus 1000.

In the present exemplary embodiment, the agent control unit 33 of the management apparatus 1000 uses <140> tickets as the number of tickets.

Figure 6:
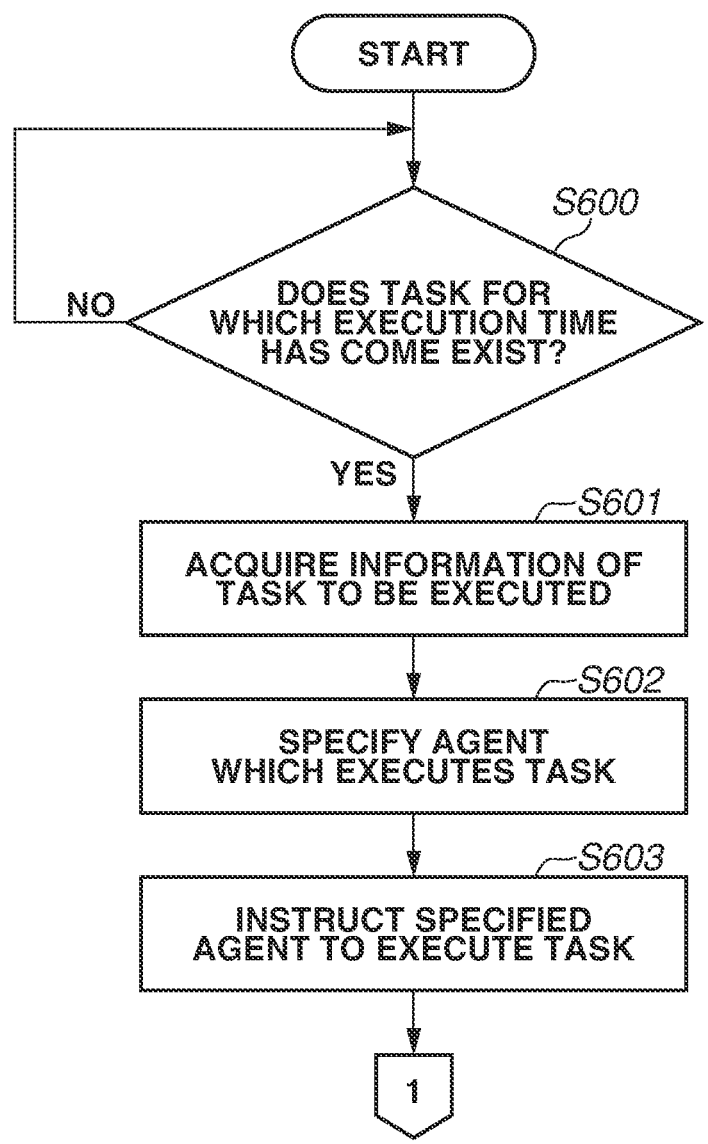
FIG. 6 is a flowchart illustrating a task execution processing by the management apparatus.

FIG. 6 illustrates a flowchart illustrating task execution processing executed by the management apparatus 1000.

In step S600, the task management unit 32 determines whether a task for which execution time of the task has come is present with reference to the execution schedule of the task stored in the data storage unit 35. In a case where the corresponding task is present (YES in step S600), the processing proceeds to step S601. Here, it is determined that a firmware updating task targeted at the devices DevA1 to An and B1 to Bn is present. The task management unit 32 notifies the agent control unit 33 of information of the task.

In step S601, the agent control unit 33 acquires the information of the task designated from the data storage unit 35 based on the notification from the task management unit 32. In step S602, the agent control unit 33 specifies an agent, from the list of agents illustrated in FIG. 4, that executes the task based on the acquired task information. In the present exemplary embodiment, the agent control unit 33 determines that the task is a task for the agent service unit 37 of Agent-A of the management client MC-A and Agent-B of the management client MC-B based on the information of the target devices.

In step S603, the agent control unit 33 instructs the specified agent service unit 37 to execute the firmware updating task.

Processing of the respective apparatuses is described below mainly in chronological order using flowcharts illustrated in FIG. 7 to FIG. 10.

Figure 7:
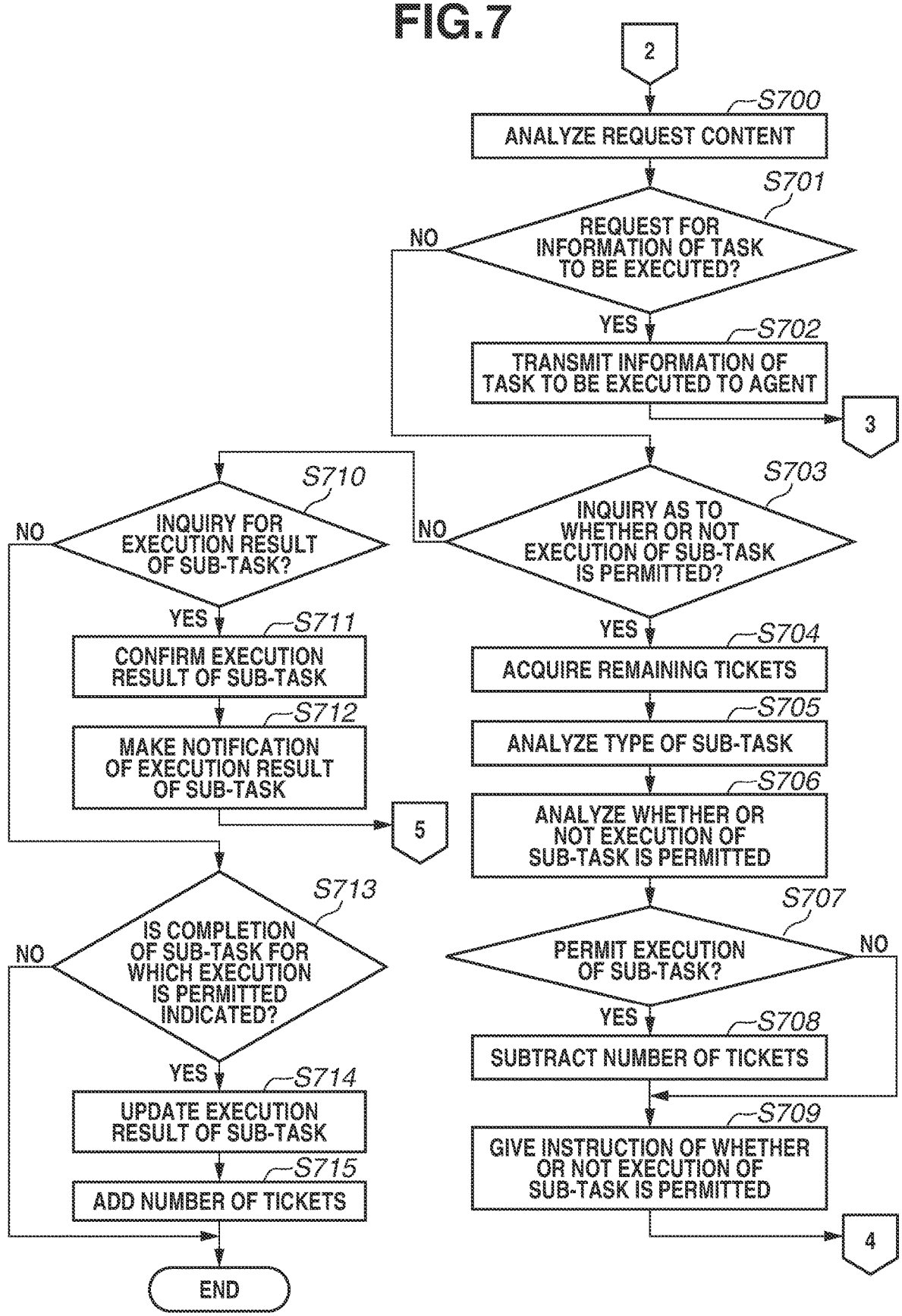
FIG. 7 is a flowchart illustrating control execution processing of a sub-task by the management apparatus.
Figure 8:
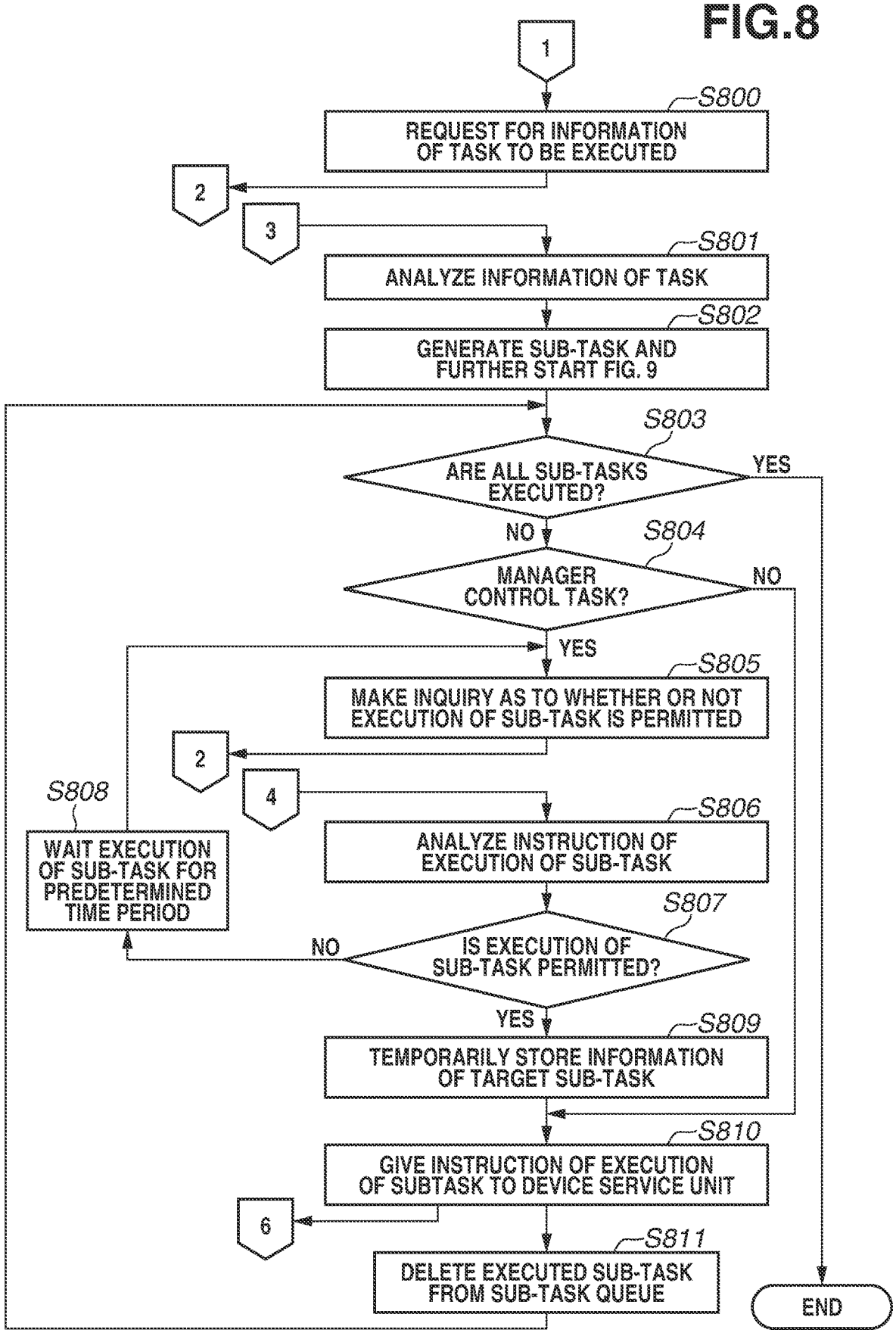
FIG. 8 is a flowchart illustrating a sub-task execution control by a management client.
Figure 9:
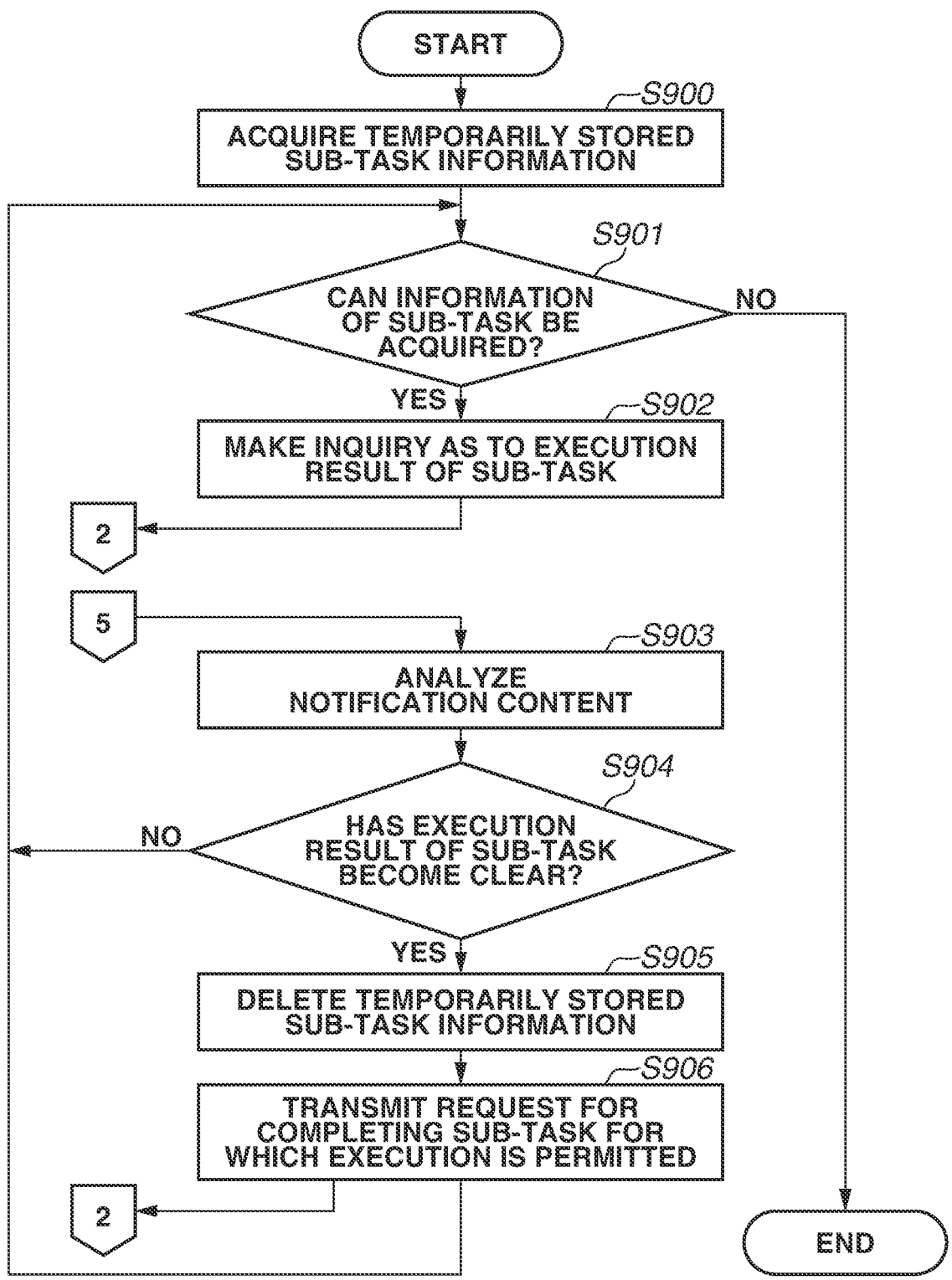
FIG. 9 is a flowchart illustrating a notification processing of a result of the sub-task by the management client.
Figure 10:
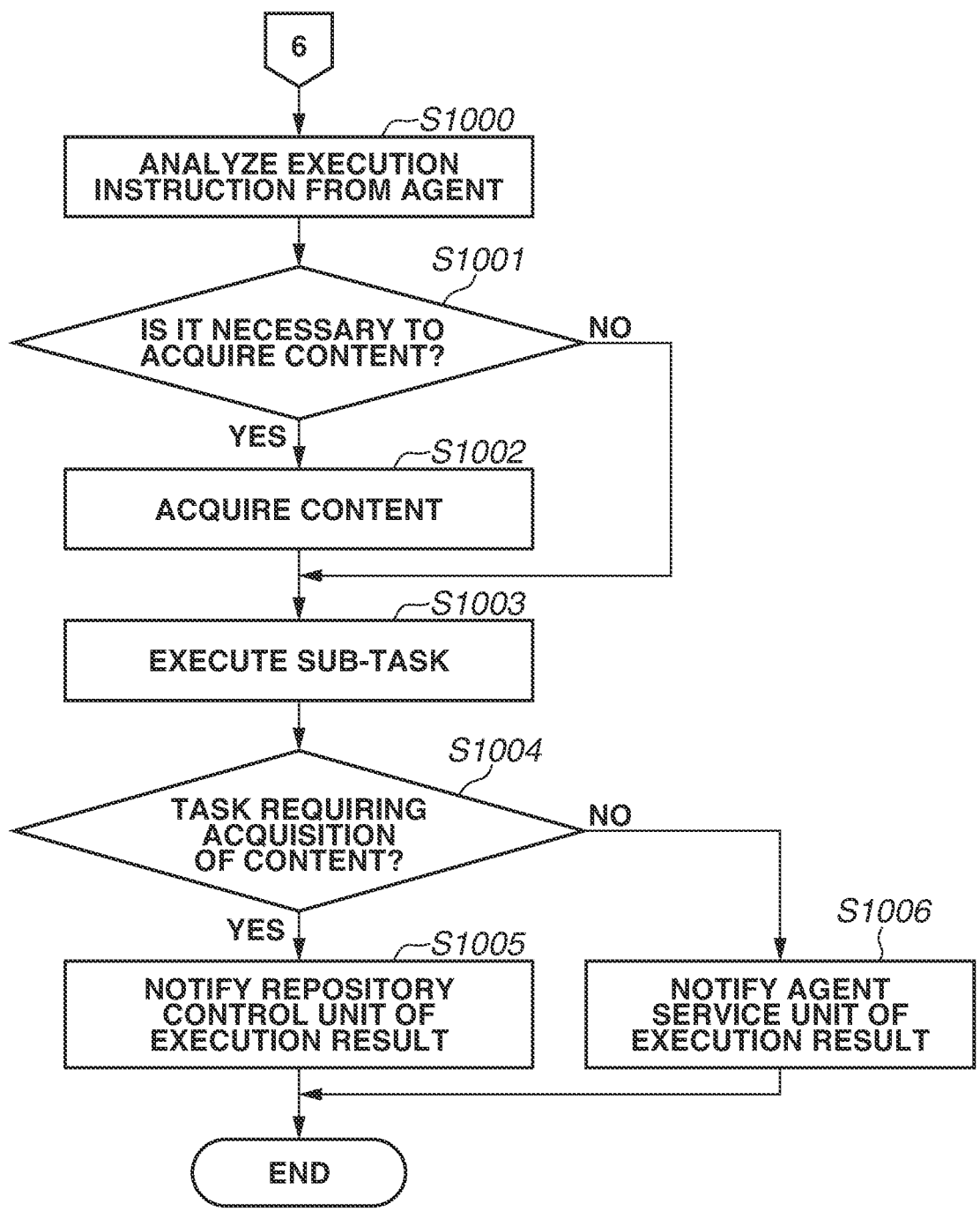
FIG. 10 is a flowchart illustrating processing related to a sub-task of a network device.

FIG. 7 illustrates a flowchart to explain processing of controlling execution of a sub-task by the management apparatus 1000. FIG. 8 illustrates a flowchart to explain processing of executing a sub-task of the management client 2000. FIG. 9 illustrates a flowchart to explain processing of making a notification of a result of the sub-task of the management client 2000. FIG. 10 illustrates a flowchart to explain processing relating to a sub-task of the device 3000.

First, processing at "1" and subsequent processing in the management client 2000 illustrated in FIG. 8 will be described.

In step S800, the agent service unit 37 requests the agent control unit 33 included in the management apparatus 1000 to provide task information of the task to be executed.

Processing at "2" and subsequent processing at the management apparatus 1000 illustrated in FIG. 7 will be described.

In step S700, the agent control unit 33 analyzes the content of the request from the agent service unit 37. In the present exemplary embodiment, the agent control unit 33 accepts the request from each agent service unit 37 included in the management clients MC-A and MC-B, and responds to each request.

In step S701, the agent control unit 33 determines whether the request is a request for acquiring the task information. In a case where it is determined that the request is a request for acquiring task information (YES in step S701), the processing proceeds to step S702. In a case where the request is other requests (NO in step S701), the processing proceeds to step S703.

In step S702, the agent control unit 33 acquires, from the data storage unit 35, the task information for the agent service unit 37 as a requestor, and transmits the task information to the agent service unit 37.

Processing at "3" and subsequent processing at the management client 2000 illustrated in FIG. 8 is described.

In step S801, the agent service unit 37 analyzes the task information received from the agent control unit 33. Here, the agent service unit 37 analyzes process content of the task and the target devices. In step S802, the agent service unit 37 generates sub-tasks of the number corresponding to the number of the target devices based on the analyzed content of the task. For example, in the present exemplary embodiment, the agent service unit 37 included in the management client MC-A generates N sub-tasks that are sub-tasks for the devices DevA1 to An. The agent service unit 37 then registers the sub-tasks in a sub-task queue managed by the agent service unit 37. In the present exemplary embodiment, a plurality of sub-tasks of the agent service units 37 of the management clients MC-A and MC-B is executed in parallel in multi-threads. Therefore, processing relating to sub-tasks performed in step S803 and subsequent steps are executed in parallel after a plurality of threads is generated.

The agent service unit 37 writes identification information of one or more sub-tasks generated in step S802 in the data storage unit 35 in association with the task information received from the agent control unit 33. With respect to this writing, the agent service unit 37 additionally writes execution results of the sub-tasks as described below.

In step S802, the agent service unit 37 starts processing illustrated in FIG. 9 for notifying the management apparatus 1000 of the execution results of the generated sub-tasks. Thereafter, the agent service unit 37 executes processing illustrated in FIG. 8 and FIG. 9 in parallel.

In step S803, the agent service unit 37 determines whether all the generated sub-tasks are executed with reference to the sub-task queue. In a case where all the tasks are executed (YES in step S803), the processing illustrated in FIG. 8 ends. In a case where not all the tasks are executed (NO in step S803), the processing proceeds to step S804.

In step S804, the agent service unit 37 determines whether the process content of the sub-tasks corresponds to the manager control task based on the task information analyzed in step S801. In a case where the process content corresponds to the manager control task (YES in step S804), the processing proceeds to step S805. In a case where the process content does not correspond to the manager control task (NO in step S804), the processing proceeds to step S810. Here, the agent service unit 37 determines that the process content corresponds to the manager control task because the sub-task relates to firmware update.

In step S805, the agent service unit 37 makes an inquiry as to whether the agent control unit 33 can execute the sub-task. A request for the inquiry includes information of a type indicating the process content of the sub-task.

Processing at "2" and subsequent processing executed in the management apparatus 1000 illustrated in FIG. 7 will be described. In step S700, the agent control unit 33 analyzes the content of the request from the agent service unit 37. The processing proceeds from step S701 to step S703, because the request is a request for making an inquiry as to whether the sub-task can be executed.

In step S703, the agent control unit 33 determines whether the inquiry is an inquiry as to whether the sub-task can be executed. In a case where it is determined that the inquiry is an inquiry as to whether the sub-task can be executed (YES in step S703), the processing proceeds to step S704.

In step S704, the agent control unit 33 acquires tickets remained until now from the data storage unit 35. As described above, an initial value of the number of tickets is <140>. In step S705, the agent control unit 33 analyzes a type of the sub-task for which an inquiry is made from the agent service unit 37. Here, the type of the sub-task includes firmware update, installment of application, update of application, and distribution of setting information.

In step S706, the agent control unit 33 analyzes whether the sub-task is executable based on the tickets acquired in step S704 and the types specified in step S705. In the present exemplary embodiment, it is defined that, in a case where the sub-task is firmware update, <3> tickets are consumed. In a case where the sub-task is installment or update of application, <1> ticket is consumed. It is also defined that <1> ticket is consumed also for distribution of setting information. These values are defined through calculation from, for example, a size of content acquired by the device service unit 38. These values may be manually adjusted by an administrator. The agent control unit 33 determines whether the sub-task can be executed from the number of tickets to be consumed corresponding to the type of the sub-task and the remaining number of tickets.

In step S707, the agent control unit 33 determines whether to permit execution of the sub-task for which an inquiry is made according to the determination in step S706. In a case where execution is permitted (YES in step S707), the processing proceeds to step S708. In step S707, the agent control unit 33 subtracts, from the remaining number of tickets acquired in step S704 the number of tickets to be consumed corresponding to the type of the sub-task analyzed in step S705. For example, the agent control unit 33 subtracts <3> tickets corresponding to the sub-task of firmware update for which execution is permitted from remaining <140> tickets.

In step S709, the agent control unit 33 responds an instruction indicating whether execution of the sub-task is permitted to the agent service unit 37 according to the determination result in step S707.

Processing at "4" and subsequent processing at the management client 2000 illustrated in FIG. 8 is described.

In step S806, the agent service unit 37 analyzes the instruction from the agent control unit 33 regarding whether execution of the sub-task is permitted.

In step S807, the agent service unit 37 determines whether execution of the sub-task is permitted. In a case where execution is permitted (YES in step S807), the processing proceeds to step S809. In a case where execution is not permitted (NO in step S807), the processing proceeds to step S808. In step S808, the agent service unit 37 performs wait processing. When a predetermined time slot has elapsed, the processing returns to step S805. By this means, an inquiry as to whether execution is permitted is made again by the agent service unit 37 for the sub-task for which execution is not permitted by the manager.

In step S809, the agent service unit 37 temporarily stores information of the sub-task to be executed. The sub-task information includes identification information of the sub-task, the type of the sub-task, information of the device 3000 for which the sub-task is to be executed, and information required for executing the sub-task (e.g., identification information of content to be acquired). The processing in step S809 is processing to temporarily record the sub-task information that is created from the manager control task and for which execution is permitted, in a case where the agent service unit 37 is caused to operate in multi-threads.

In step S810, the agent service unit 37 instructs the device service unit 38 included in the device 3000 designated in the sub-task to execute processing based on content of the sub-task. Specifically, the agent service unit 37 transmits an instruction to execute firmware update including identification information of the sub-task, the type of the sub-task, identification information of content to be acquired by the device service units 38. In step S811, the agent service unit 37 deletes the sub-task, from the sub-task queue, for which the execution instruction is given in step S810.

Processing at "6" and subsequent processing at the device 3000 illustrated in FIG. 10 is described.

In step S1000, the device service unit 38 analyzes content of the execution instruction given from the agent service unit 37. The device service unit 38 analyzes content of the execution instruction based on the sub-task given from the agent service unit 37 included in the management client MC-A.

In step S1001, the device service unit 38 determines whether it is necessary to acquire content as a result of analysis of the content of the execution instruction. In a case where it is determined that it is necessary to acquire content (YES in step S1001), the processing proceeds to step S1002. In a case where it is determined that it is not necessary to acquire content (NO in step S1001), the processing proceeds to step S1003. In a case where the type of the sub-task is firmware update, it is determined that it is necessary to acquire content from the repository storage unit 36 via the repository control unit 34.

In step S1002, the device service unit 38 requests content, from the repository storage unit 36, corresponding to identification information included in the execution instruction via the repository control unit 34. In response to this request, a content file such as firmware is acquired from the repository control unit 34.

In step S1003, the device service unit 38 executes processing relating to the sub-task based on the execution instruction. In a case of firmware update, the content file acquired in step S1002 is opened, and update processing of firmware is executed.

In a case where the sub-task is installation of application, the content file acquired in step S1002 is opened, and installation processing of the application is executed. In a case where the sub-task is for search processing or acquisition processing of operation information, a response including information, such as equipment information and a status managed within the device 3000, is generated. The response generated here is transmitted to the agent service unit 37 as a notification of an execution result acquired in step S1006 as described below.

In step S1004, the device service unit 38 determines whether the sub-task is a sub-task that requires acquisition of content. In a case where the sub-task is a sub-task which requires acquisition of content (YES in step S1004), the processing proceeds to step S1005, and otherwise (NO in step S1004), the processing proceeds to step S1006.

In step S1005, the device service unit 38 notifies the repository control unit 34 of completion of application of the acquired content as an execution result. This notification includes identification information of the sub-task. The repository control unit 34 included in the management apparatus 1000 executes, in response to this notification, writing of the execution result of the sub-task in the data storage unit 35 along with the identification information of the sub-task. In the execution result, a status of completion indicating that processing is successfully finished or abnormally terminated (e.g., failure) is written. The device service unit 38 notifies the repository control unit 34 of the management apparatus 1000 of identification information of the sub-task of firmware update and the execution result of the sub-task.

In step S1006, the device service unit 38 notifies the agent service unit 37 of the management client 2000 of the execution result of the sub-task. The agent service unit 37 writes the execution result of the sub-task in the data storage unit 35 along with the identification information of the sub-task in response to the notification of the execution result.

In the present exemplary embodiment, the repository control unit 34 which controls content and the repository storage unit 36 have forms separately and independently from the manager unit 30 within the management apparatus 1000. The repository control unit 34 writes the execution result of the sub-task in the data storage unit 35 through control, protocol, or the like, similar to those used in the agent service unit 37. Accordingly, the repository control unit 34 and the repository storage unit 36 can be achieved using different apparatuses on a network different from that of an apparatus on which the manager unit 30 operates. In comparison with other type of sub-tasks, it takes more time in processing of applying the sub-task that requires acquisition of content in step S1003. Further, it is not necessary to transmit a response managed within the device 3000 to the agent service unit 37. Thus, the device service unit 38 transmits the execution result of the sub-task, which requires acquisition of content, to the repository control unit 34 instead of transmitting the execution result to the agent service unit 37.

Processing of making a notification of a result of a sub-task of the management client 2000 is described next with reference to FIG. 9.

In step S900, the agent service unit 37 acquires information of the sub-task temporarily stored in step S809.

In step S901, the agent service unit 37 determines whether the information of the sub-task temporarily stored has been acquired. In a case where the information has been acquired (YES in step S901), the processing proceeds to step S902. In a case where the information has not been acquired (NO in step S901), the processing illustrated in FIG. 9 ends.

In step S902, the agent service unit 37 transmits a request to make an inquiry as to an execution result of the information of the sub-task acquired in step S900 to the agent control unit 33. This request includes identification information of the sub-task stored as the information of the sub-task acquired in step S900. In a case where information of a plurality of sub-tasks is acquired in step S900, identification information of the plurality of sub-tasks may be included in the request.

Processing at "2" and subsequent processing at the management apparatus 1000 illustrated in FIG. 7 is described. In step S700, the agent control unit 33 analyzes the content of the request acquired from the agent service unit 37. The processing proceeds through step S701 and step S703 to step S710, because the request is a request to make an inquiry about the execution result of the sub-task.

In step S710, the agent control unit 33 determines whether the inquiry is an inquiry as to the execution result of the sub-task. In a case of an inquiry as to the execution result of the sub-task (YES in step S710), the processing proceeds to step S711.

In step S711, the agent control unit 33 accesses the data storage unit 35 based on the identification information of the sub-task included in the request, and confirms the execution result of the target sub-task. Here, a write area by the repository control unit 34 is referred. In step S712, in a case where it is confirmed that the execution result is written by the repository control unit 34, the agent control unit 33 notifies the agent service unit 37 of the execution result of the target sub-task. In a case where the execution result cannot be confirmed, the agent service unit 37 is notified that the execution result cannot be confirmed. In a case where identification information of a plurality of sub-tasks is included in the request, and if execution results of these sub-tasks exist in the data storage unit 35, the agent control unit 33 makes a notification of all these results.

Processing at "5" and subsequent processing at the management client 2000 illustrated in FIG. 9 is described.

In step S903, the agent service unit 37 analyzes content of the execution result of the sub-task notified from the agent control unit 33. In step S904, the agent service unit 37 determines whether the execution result of the sub-task has become clear. In a case where the execution result is confirmed at the agent control unit 33 (YES in step S904), and the agent service unit 37 is notified of the execution result, the processing proceeds to step S905 assuming that the execution result has become clear. In a case where the execution result has not become clear (NO in step S904), the processing returns to step S901.

In step S905, the agent service unit 37 deletes the information of the sub-task which is temporarily stored in step S809 and for which the execution result has become clear. In step S906, the agent service unit 37 transmits a request indicating completion of the sub-task for which execution is permitted to the agent control unit 33, and the processing returns to step S901. The request to be transmitted includes identification information of the sub-task.

Processing at "2" and subsequent processing at the management apparatus 1000 illustrated in FIG. 7 is described. In step S700, the agent control unit 33 analyzes the content of the request acquired from the agent service unit 37. The processing proceeds through step S701, step S703, and step S710 to step S713.

In step S713, the agent control unit 33 determines whether the received request indicates completion of the sub-task for which execution is permitted. In a case where the request indicates completion of the sub-task for which execution is permitted (YES in step S713), the processing proceeds to step S714.

In step S714, the agent control unit 33 accesses the data storage unit 35 and writes the execution result of the corresponding sub-task, in the data storage unit 35, based on the identification information included in the request. This processing is performed to prevent the execution result for the sub-task created from the manager control task from being written in step S1006 in an entry of the sub-task created in step S802.

In step S715, the agent control unit 33 adds tickets required for executing the target sub-task inversely with processing in step S708 described above. For example, the agent control unit 33 adds <3> tickets because the sub-task for which the execution result is updated is firmware update.

Tickets are added under the condition that firmware update is completed in step S715. However, it is also possible to employ a configuration where tickets are added under the condition that downloading of content, such as firmware at the device service unit 38, is completed. Specifically, the agent service unit 37 monitors the data storage unit 35 by way of the agent control unit 33 to judge whether the condition is satisfied.

This configuration provides further effects of shortening a task processing time because tickets are released earlier.

In a case where a plurality of manager control tasks, which are also described in the first exemplary embodiment, are created at the management apparatus 1000, there is a case where execution periods of these tasks overlap with each other. In this case, there is a possibility that all tickets are utilized by one task, particularly, a sub-task based on one type of the task.

In a second exemplary embodiment, in addition to the configuration described in the first exemplary embodiment, an higher limit of the number of tickets according to types of sub-tasks is adjusted while load of access (e.g., a long connection period) to the repository control unit 34 is taken into account. For example, adjustment is performed so that 70% of the total number of tickets is used as tickets for firmware updating tasks, and the remaining 30% is used as tickets for application updating tasks.

Specifically, the task management unit 32 of the management apparatus 1000 checks execution schedules already created at a timing at which a new task is generated or at step S600 illustrated in FIG. 6. The task management unit 32 further determines whether there is a plurality of tasks that includes content acquisition for which execution periods are likely to overlap with each other. In a case where there is a plurality of tasks for which execution periods overlap with each other, adjustment is performed so that 70% of the total number of tickets is used as tickets for firmware updating tasks, and the remaining 30% is used as tickets for application updating tasks. The remaining number of tickets are then managed for each type of tasks.

The agent control unit 33 checks a type of the sub-task acquired in step S704, and acquires the remaining number of tickets managed according to the corresponding type of the task.

There is a case where the agent service unit 37 which has subtracted tickets to start execution of the sub-task for which execution is permitted stops halfway through the processing. There is also a case where the management client 2000 itself on which the agent service unit 37 operates is shut down.

The tickets allocated to the agent service unit 37 that is put into a state where operation is impossible are desirably utilized at another agent service unit 37.

In a third exemplary embodiment, in addition to the configurations in the first and the second exemplary embodiments, a configuration for collecting tickets allocated to the agent service unit 37 which is put into a state where operation is impossible is achieved.

Specifically, the agent control unit 33 of the management apparatus 1000 regularly requests response confirmation to the management client 2000 that gives an instruction to be executable for the sub-task, or the agent service unit 37 included in the management client 2000. This request may be a request for making an inquiry as to an execution status of the sub-task or a status of the management client 2000. In a case where a predetermined time period has elapsed without a response made, the agent control unit 33 executes processing similar to processing illustrated in step S714 and step S715 in FIG. 7. Specifically, the agent control unit 33 writes execution results of one or more sub-tasks for which execution is permitted for the agent service unit 37 included in the management client 2000 that has not made a response as abnormal termination. The agent control unit 33 further performs processing of adding the number of tickets corresponding to these sub-tasks to the remaining number of tickets.

In exemplary embodiments of the present disclosure, all of the manager unit 30, the repository control unit 34, the repository storage unit 36, and the agent service unit 37 can be implemented within one information processing apparatus. In such a case, it is also possible not to set a great value for the number of tickets while taking into account execution load, at the agent service unit 37, of the sub-tasks generated from tasks other than the manager control task.

In a fourth exemplary embodiment, in addition to the configurations in the first to the third exemplary embodiments, a configuration is employed where, in such a case, the remaining number of tickets is dynamically increased during a period while tasks other than the manager control task are not executed or while tasks other than the manager control task are less executed.

Specifically, the agent control unit 33 of the management apparatus 1000 calculates the number of tasks of the manager control task and the number of tasks of types other than the manager control task, during a period while execution of the tasks overlap with each other based on the execution schedules. In a case where the number of tasks of types other than the manager control tasks is less than or equal to a prescribed value set in advance, the agent control unit 33 increases the remaining number of tickets that can be used for the manager control task. It is also possible to employ a configuration where the number of tickets that can be used only for the manager control task is temporarily and separately secured.

There is a case where, the numbers of devices 3000 respectively needed by the agent service units 37 included in the respective management clients 2000 are different in a task to be executed. For example, there is a case where the agent service unit 37 included in the management client MC-A executes manager control task for 450 devices, and the agent service unit 37 included in the management client MC-B executes manager control task for 50 devices. In such a case, it is desirable that execution of sub-tasks at the agent service unit 37 included in the management client MC-A is permitted at a higher rate than execution of the sub-tasks at the agent service unit 37 included in the management client MC-B.

In a fifth exemplary embodiment, the agent control unit 33 included in the management apparatus 1000 calculates a ratio between the agent service units 37 that execute tasks and the devices 3000, when agents that execute tasks are specified in step S602 illustrated in FIG. 6. Then, the agent control unit 33 included in the management apparatus 1000 allocates tickets to the agent service unit 37 included in the management client 2000 according to the ratio calculated before when acquiring the tickets illustrated in step S704 in FIG. 7.

The present disclosure also incorporates apparatuses, systems and methods configured by combining the above-described exemplary embodiments as appropriate.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2018-220734, filed Nov. 26, 2018, and No. 2019-048234, filed Mar. 15, 2019, which are hereby incorporated by reference herein in their entirety.

What is claimed is:

1. A system comprising:
a plurality of agent apparatuses; and
a management apparatus configured to monitor a plurality of network devices via the plurality of agent apparatuses,
wherein the management apparatus comprises at least one memory storing first instructions and at least one processor executing the first instructions causing the management apparatus to:
create a task in which a process content and a network device, which is a processing target, are set; and
transmit information of the task to each agent apparatus configured to monitor one or more network devices set as the processing target in the created task,
wherein each agent apparatus comprises at least one memory storing second instructions and at least one processor executing the second instructions causing the agent apparatus to:
receive the information of the task; and
transmit a request for making an inquiry as to whether execution of each of one or more sub-tasks corresponding to the one or more network devices set as the processing target in the received task is to be permitted on the management apparatus in a case where the task is a manager control task,
wherein the first instructions further cause the management apparatus to:
manage an execution result of processing executed in each network device for each of the one or more sub-tasks based on the manager control task; and
transmit a response indicating whether execution is permitted for the inquiry to control a number of sub-tasks executed in parallel in a same time slot,
wherein the second instructions further cause the agent apparatus to:
instruct a network device, which is a target of a sub-task, for which execution is permitted for the inquiry, to perform processing relating to the sub-task; and
transmit a request for making an inquiry again to the management apparatus for a sub-task for which execution is not permitted by the management apparatus after a predetermined time period has elapsed.

2. The system according to claim 1, wherein the manager control task is a task that requires a request, for downloading a content, to a repository via a network by a network device that has accepted an execution instruction according to the sub-task generated based on the manager control task.

3. The system according to claim 2, wherein the content is any of firmware, application, and/or setting information.

4. The system according to claim 2, wherein the repository operates within a same apparatus as the management apparatus.

5. The system according to claim 1, wherein the agent apparatus that has received the information of the task does not transmit the request for making an inquiry to the management apparatus, and instructs a network device that is a target of each sub-task to perform processing relating to each sub-task generated based on the task, in a case where the task is not the manager control task.

6. The system according to claim 1, wherein the first instructions further cause the management apparatus to:
manage a number of tickets to control a number of sub-tasks executed in parallel in a same time slot;
consume tickets of a predetermined number in a case where execution of a sub-task is permitted;
add tickets of a predetermined number in a case where execution of the sub-task is completed; and
determine whether to make a response indicating that execution of a sub-task is permitted for the inquiry based on a remaining number of managed tickets.

7. The system according to claim 2, wherein the first instructions further cause the management apparatus to:
manage a number of tickets for controlling a number of sub-tasks executed in parallel in a same time slot;
consume tickets of a predetermined number in a case where execution of a sub-task is permitted;
add tickets of a predetermined number in a case where downloading of the content that is a target of the sub-task is completed; and
determine whether to make a response indicating that execution of a sub-task is permitted for the inquiry based on a remaining number of managed tickets.

8. The system according to claim 6, wherein the number of tickets consumed or added varies based on a type of a sub-task.

9. The system according to claim 1, wherein the management apparatus manages an execution result of processing executed in each network device for each of sub-tasks based on a notification from each agent apparatus.

10. A management apparatus configured to monitor a plurality of network devices via a plurality of agent apparatuses, the management apparatus comprising:
at least one memory storing instructions; and
at least one processor executing the instructions causing the management apparatus to:
create a manager control task in which a process content and a network device, which is a processing target, are set;
transmit information of the manager control task to each agent apparatus configured to monitor one or more network devices set as the processing target in the created manager control task;
receive, from the agent apparatus, an inquiry as to whether execution of a sub-task based on the manager control task is permitted;
determine whether to permit the execution of the sub-task, based on a number of previously permitted sub-tasks executing in parallel in a same time slot;
transmit a response indicating whether execution is permitted for the inquiry; and
manage an execution result of processing executed in each network device for each of one or more sub-tasks based on the manager control task,
wherein the agent apparatus will retransmit the inquiry for a sub-task for which execution was not permitted to the management apparatus after a predetermined time period has elapsed.

11. A method for a management apparatus configured to monitor a plurality of network devices via a plurality of agent apparatuses, the method comprising:
creating a manager control task in which a process content and a network device, which is a processing target, are set;
transmitting information of the manager control task to each agent apparatus configured to monitor one or more network devices set as the processing target in the created manager control task;

receiving, from the agent apparatus, an inquiry as to whether execution of a sub-task based on the manager control task is permitted;

determining whether to permit the execution of the sub-task, based on a number of previously permitted sub-tasks executing in parallel in a same time slot;

transmitting a response indicating whether execution is permitted for the inquiry; and managing an execution result of processing executed in each network device for each of one or more sub-tasks based on the manager control task, wherein the agent apparatus will retransmit the inquiry for a sub-task for which execution was not permitted to the management apparatus after a predetermined time period has elapsed.

12. A non-transitory computer-readable storage medium having computer executable instructions stored thereon, wherein the instructions cause a management apparatus to:

create a manager control task in which a process content and a network device, which is a processing target, are set;

transmit information of the manager control task to each agent apparatus configured to monitor one or more network devices set as the processing target in the created manager control task;

receive, from the agent apparatus, an inquiry as to whether execution of a sub-task based on the manager control task is permitted;

determine whether to permit the execution of the sub-task, based on a number of previously permitted sub-tasks executing in parallel in a same time slot;

transmit a response indicating whether execution is permitted for the inquiry; and manage an execution result of processing executed in each network device for each of one or more sub-tasks based on the manager control task, wherein the agent apparatus will retransmit the inquiry for a sub-task for which execution was not permitted to the management apparatus after a predetermined time period has elapsed.

* * * * *